UNITED STATES PATENT OFFICE.

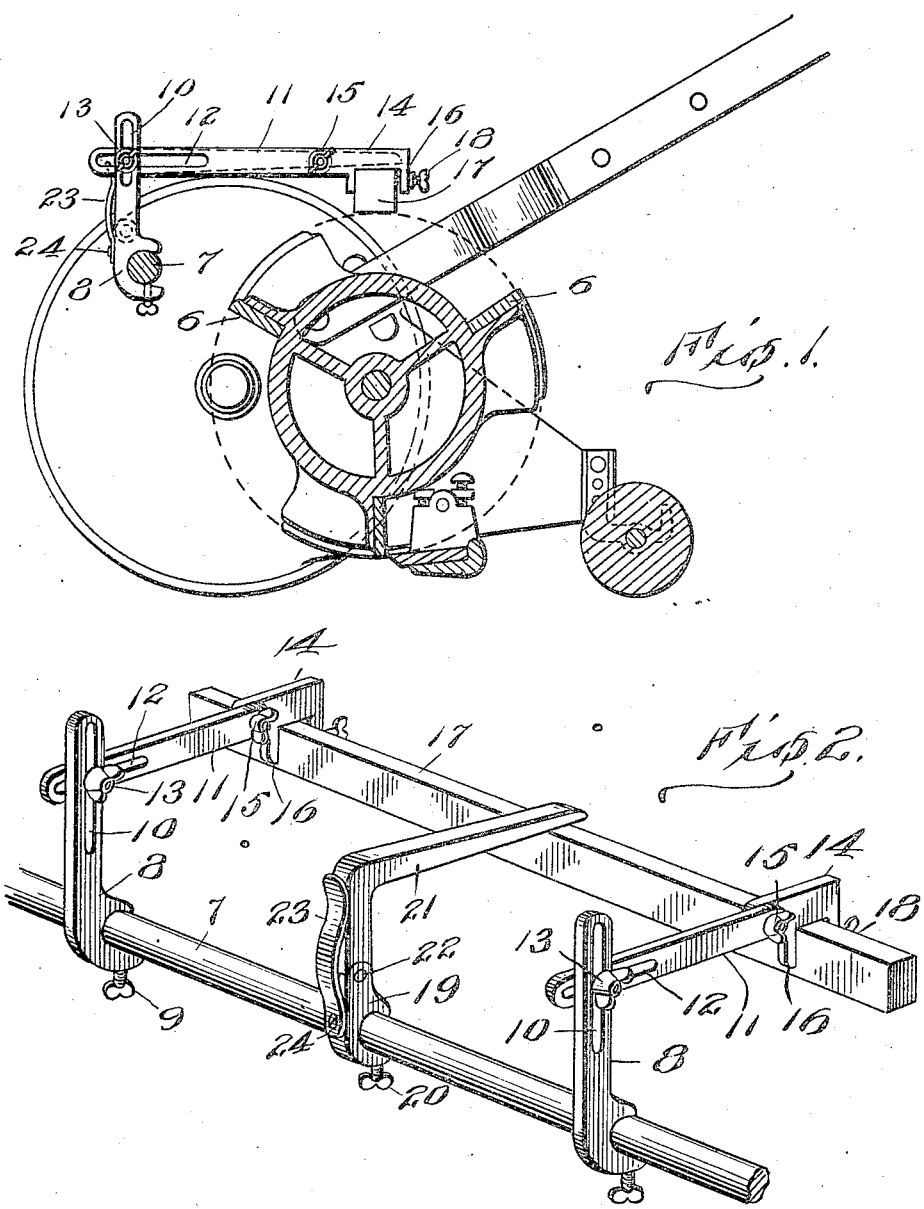

EDWARD MERRITT, OF WESTMINSTER, MASSACHUSETTS.

SHARPENER FOR LAWN-MOWERS.

942,578.  Specification of Letters Patent.  Patented Dec. 7, 1909.

Application filed September 14, 1909. Serial No. 517,616.

*To all whom it may concern:*

Be it known that I, EDWARD MERRITT, a citizen of the United States, residing at Westminster, in the county of Worcester and State of Massachusetts, have invented certain new and useful Improvements in Sharpeners for Lawn-Mowers, of which the following is a specification.

This invention relates to lawn mower sharpeners, and comprises a device which can be applied to an ordinary lawn mower for the purpose of automatically sharpening the knives during the operation of the mower.

It consists of an emery rod held in proper position to grind the edges of the knives as they rotate, the holder for the rod including a spring which presses the rod against the knives with a tension which may be adjusted as desired.

The attachment is capable of being easily drawn out of action when not needed, without removing the same from the machine.

The invention is illustrated in the accompanying drawings in which—

Figure 1 is a vertical section showing the device applied to a lawn mower. Fig. 2 is a perspective view of the attachment removed from the machine.

Referring specifically to the drawings, 6 indicates the knives and 7 the guard rod of a known lawn mower. The attachment is supported on said rod by means of a pair of brackets 8 clamped thereto by screws 9. Each bracket has an upwardly extending arm or part slotted as at 10.

11 indicates adjustable links or arms which are slotted as at 12 and are fastened to the brackets 8 by thumb screws 13. When in position these arms extend rearwardly from the brackets and may be adjusted to any desired position or angle by means of the screws 13 which extend through the slots 10 and 12. The rear end of each arm is connected to a holder 14 by means of a thumb screw 15. The holder has jaws 16 between which the emery rod 17 is held by a set screw 18. By proper adjustment of the set screws the angle and position of the emery rod may be varied with respect to the knives to produce any desired bevel, the parts described acting to support said rod in position above the knives. The emery rod will preferably be made square or angular so that any one of its faces can be presented to the knives.

Located between the supports described is a bracket 19, fastened to the knife guard 7 by a set screw 20. A bent lever 21 is pivoted to this bracket at 22 and is properly shaped to bear or rest on the upper side of the emery bar 17 at about the middle thereof. The lever is pressed downwardly by a flat spring 23 fastened to the bracket 19 by screw 24 which may be adjusted to vary the pressure of the spring on the lever. The lever arm and its spring will press the emery rod against the knives as the latter rotate, the connections of the emery holders with the links 11 being sufficiently loose to allow the necessary movement of the emery bar which thus rests by its weight and also by the pressure of the spring 23 upon the edge of the knives as the latter rotate, and the spring 23 keeps the proper bevel and pressure on the knives at all times.

When the lawn mower is driven the rotation of the knives against the emery sharpens the former in an obvious manner, without interfering with the ordinary action of the mower. Hence the knives may be sharpened while the mower is in use.

The attachment can be thrown out of action by simply turning the spring 23 to one side which allows the emery bar to be swung up or over upon the arms 11 where it will rest until desired for use again.

What I claim as new is:

1. A sharpener for lawn mowers, comprising an abrading bar adapted to rest upon the knives of the mower, supports for said bar, and a spring-pressed lever bearing against said bar to hold the same to the knives.

2. A sharpener for lawn mowers, comprising an abrading bar adapted to rest upon the knives of the mower, supports for the bar attachable to the guard rod of the mower, a bracket adapted to be fixed to said rod, a lever pivoted to the bracket and bearing on the bar to press the same against the knives, and a spring bearing on the lever.

3. A sharpener for lawn mowers, comprising brackets adapted for attachment to the guard rod of the mower, links adjustably connected to the brackets, holders pivotally connected to the links, and an abrading bar carried by the holders and arranged to rest on the knives of the mower.

In testimony whereof, I affix my signature in presence of two witnesses.

EDWARD MERRITT.

Witnesses:
　CHARLES W. BEAN,
　JOHN C. GOODRIDGE.